United States Patent
Tani (10) Patent No.: US 9,252,630 B2
(45) Date of Patent: Feb. 2, 2016

(54) BATTERY CHARGE CONTROL APPARATUS

(71) Applicant: DENSO CORPORATION, Kariya, Aichi-pref. (JP)

(72) Inventor: Keisuke Tani, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/565,449

(22) Filed: Dec. 10, 2014

(65) Prior Publication Data

US 2015/0091526 A1  Apr. 2, 2015

Related U.S. Application Data (62) Division of application No. 13/312,018, filed on Dec. 6, 2011.

(30) Foreign Application Priority Data

Dec. 7, 2010  (JP) ................. 2010-272750

(51) Int. Cl.
*H02J 7/00* (2006.01)
*H02J 7/14* (2006.01)
*B60L 11/18* (2006.01)

(52) U.S. Cl.
CPC ........... *H02J 7/1453* (2013.01); *B60L 11/1809* (2013.01); *H02J 7/0031* (2013.01); *Y02T 10/7005* (2013.01)

(58) Field of Classification Search
USPC ......................................... 320/104
See application file for complete search history.

(56) References Cited

U.S. PATENT DOCUMENTS

| | | | | |
|---|---|---|---|---|
| 6,137,263 A | * | 10/2000 | Kawai et al. | 320/132 |
| 6,441,588 B1 | | 8/2002 | Yagi et al. | |
| 6,953,100 B2 | | 10/2005 | Aberle et al. | |
| 2006/0122737 A1 | * | 6/2006 | Tani et al. | 700/286 |
| 2007/0021267 A1 | * | 1/2007 | Obayashi et al. | 477/107 |
| 2012/0139481 A1 | | 6/2012 | Tani | |

FOREIGN PATENT DOCUMENTS

| | | |
|---|---|---|
| JP | 2006-166639 | 6/2006 |
| JP | 2010-119171 | 5/2010 |

OTHER PUBLICATIONS

Office Action (3 pages) dated Jan. 21, 2014, issued in corresponding Japanese Application No. 2010-272750 and English translation (4 pages).

* cited by examiner

*Primary Examiner* — Samuel Berhanu
(74) *Attorney, Agent, or Firm* — Nixon & Vanderhye PC (57) ABSTRACT

A battery charge control apparatus for a vehicle, where the vehicle is provided with a prime mover driven by using fuel stored in the vehicle, power generation means for converting energy generated by the prime mover using the fuel into electrical energy, and a secondary battery that stores the electrical energy generated by the power generation means. The apparatus includes temperature detection means for detecting a temperature of the battery, and battery-charge limiting means for limiting storing of the electrical energy generated by the power generation means into the battery when the temperature of the battery detected by the temperature detection means is low. This leads to enhancement of fuel usage efficiency of the engine.

12 Claims, 6 Drawing Sheets

BATTERY CHARGE CONTROL APPARATUS

CROSS-REFERENCE TO RELATED APPLICATION

This application is a Divisional of application Ser. No. 13/312,018, filed Dec. 6, 2011, which claims priority from earlier Japanese Patent Application No. 2010-272750 filed Dec. 7, 2010, the disclosures of each of which are incorporated herein by reference.

BACKGROUND

1. Technical Field

This invention relates to a battery charge control apparatus for a vehicle, where the vehicle is provided with a prime mover driven by using fuel stored in the vehicle, power generation means for converting energy generated by the prime mover using the fuel into electrical energy, and a secondary battery that stores the electrical energy.

2. Related Art

A known battery charge control apparatus, as disclosed in Japanese Patent Application Publication No. 2006-166639, is adapted to set a power for charging a secondary battery as a function of a maximum power that allows a cost of fuel consumption per unit electrical power to be kept equal to or smaller than a target cost. In general, when a power requirement of a drive wheel is small, an operating point of an engine is shifted to a higher load by increasing a power output of a generator of the vehicle, which leads to enhancement of fuel usage efficiency of the engine. The apparatus as disclosed above is thus operative to increase the power output of the generator to charge the secondary battery when the power requirement of the drive wheel is small.

Meanwhile, when an amount of battery charging power is increased, a battery charging current becomes larger, which will probably lead to an increase in charging loss due to the presence of internal resistance of the battery. According to findings of a study of the inventors of the present application, since the internal resistance of the secondary battery becomes larger as the temperature of the secondary battery decreases in a winter season or the like, the charging loss becomes larger, which leads to a danger that a decrease in fuel utilization efficiency may exceed a benefit of reducing of the fuel consumption in low cost power generation.

In consideration of the foregoing, exemplary embodiments of the present invention are directed to providing a battery charge control apparatus for a vehicle, where the vehicle is provided with a prime mover driven by using fuel stored in the vehicle, power generation means for converting energy generated by the prime mover using the fuel into electrical energy, and a secondary battery that stores the electrical energy.

SUMMARY

In accordance with an exemplary embodiment of the present invention, there is provided a battery charge control apparatus for a vehicle, where the vehicle is provided with a prime mover driven by using fuel stored in the vehicle, power generation means for converting energy generated by the prime mover using the fuel into electrical energy, and a secondary battery that stores the electrical energy generated by the power generation means. The apparatus includes: temperature detection means for detecting a temperature of the battery; and battery-charge limiting means for limiting storing of the electrical energy generated by the power generation means into the battery when the temperature of the battery detected by the temperature detection means is low.

In general, as the temperature of the secondary battery becomes lower, a larger amount of thermal energy (i.e., the charging loss) is generated from the fuel because some of energy generated from the fuel is converted not into electrical energy to be actually stored in the battery, but into waste thermal energy, which may lead to decrease in fuel utilization efficiency. The apparatus in accordance with the above embodiment can suitably suppress the decrease in fuel utilization efficiency by limiting an amount of energy generated from the fuel to be stored as electrical energy in the battery when the temperature of the secondary battery is low.

In accordance with another exemplary embodiment of the present invention, there is provided a battery charge control apparatus for a vehicle, where the vehicle is provided with a prime mover driven by using fuel stored in the vehicle, power generation means for converting energy generated by the prime mover using the fuel into electrical energy, and a secondary battery that stores the electrical energy generated by the power generation means. The apparatus includes: cost calculation means for calculating a cost that is an amount of fuel consumed by the prime mover to generate the battery charging power used to actually store unit electric power in the battery; upper-limit setting means for setting an upper limit of the cost on the basis of at least one of a state of charge (SOC) of the battery and a power requirement of a load that is supplied with the electrical power from the battery; and battery-charge limiting means for setting the battery charging power such that the cost calculated by the cost calculation means becomes equal to or smaller than the upper limit set by the upper-limit setting means.

There may be a deviation between the charging power for storing the electrical energy in the battery and electrical power actually stored in the battery. More specifically, the deviation increases as the temperature of the battery decreases or the charging current increases, which leads to decrease in fuel utilization efficiency. In the apparatus of the embodiment, the deviation can be quantitatively assessed with the cost, which can be used to calculate the charging power that can suitably suppress decrease in fuel utilization efficiency.

In accordance with still another exemplary embodiment of the present invention, there is provided a battery charge control apparatus for a vehicle, where the vehicle is provided with a prime mover driven by using fuel stored in the vehicle and mechanically-connected to a drive wheel, power generation means for converting energy generated by the prime mover using the fuel into electrical energy, and a secondary battery that stores the electrical energy generated by the power generation means. The apparatus includes: temperature detection means for detecting a temperature of the battery; and battery charging power setting means for variably setting a battery charging power supplied from the power generation means to the battery to one of three or more discrete values or a continuous value as a function of the temperature of the battery detected by the temperature detection means such that the battery charging power decreases as the temperature of the battery detected by the temperature detection means decreases, while a state of charge (SOC) of the battery, a power requirement of the drive wheel, and a power requirement of a vehicle-mounted component other than the battery, which is supplied with electrical power from the power generation means, are all remaining unchanged.

In general, as the temperature of the battery becomes lower, a larger amount of thermal energy (i.e., the charging loss) is generated from the fuel because some of energy generated from the fuel is converted not into electrical energy to be actually stored in the battery, but into waste thermal energy, which leads to decrease in fuel utilization efficiency. The apparatus of the embodiment can suitably suppress such decrease in fuel utilization efficiency by limiting storing of the electrical energy generated from the fuel in the battery when the temperature of the battery is low. In particular, since the charging power is discreetly variably set in three or more steps or continuously variably set as a function of the temperature of the battery, it becomes possible to suitably reflect battery charge limiting request as a function of the temperature of the battery.

DESCRIPTION OF SPECIFIC EMBODIMENTS

The present invention will be described more fully hereinafter with reference to the accompanying drawings. Like numbers refer to like elements throughout.

Figure 1:
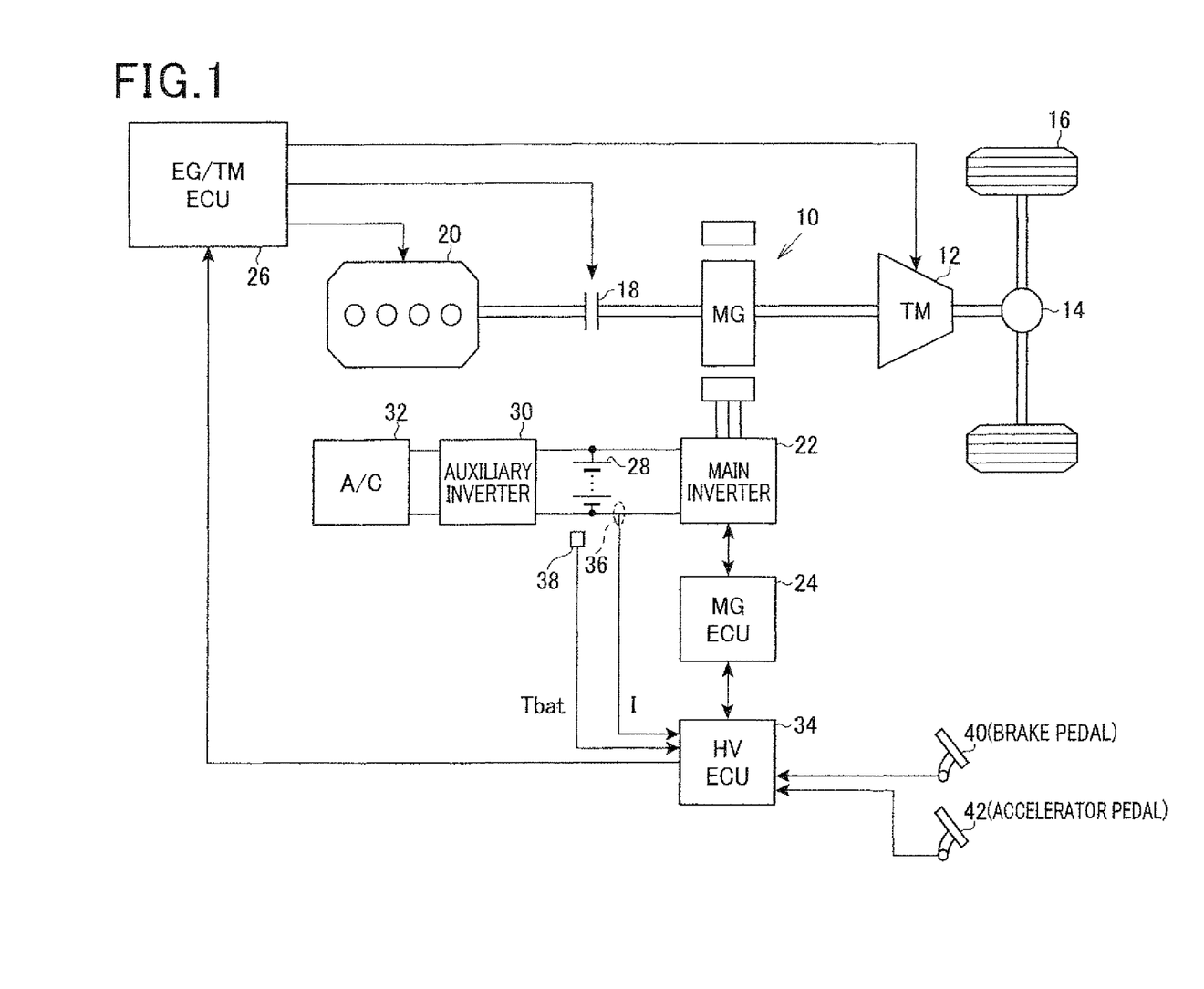
FIG. 1 schematically shows a secondary-battery charge control apparatus for a parallel hybrid vehicle in accordance with one embodiment of the present embodiment.

FIG. 1 schematically shows a secondary-battery charge control apparatus suitable for a parallel hybrid vehicle in accordance with one embodiment of the present embodiment.

Referring to FIG. 1, the motor generator (MG) 10, which is a vehicle-mounted main component, is mechanically connected to a drive wheel 16 via a continuously variable transmission (CVT) 12 and a differential gear 14. The motor generator 10 is also mechanically connected to an internal-combustion engine 20 via a clutch 18. The clutch 18 is electronically controlled engagement means for performing engagement and disengagement between the motor generator 10 and the engine 20.

The motor generator 10 supplies electrical power to and receives electrical power from a high-voltage battery 28 via the main inverter 22. The high-voltage battery 28 is a lithium-ion secondary battery with a high terminal voltage for example, of 100 V or higher. The main inverter 22 is controlled by an electrical control unit for the motor generator (MG ECU) 24. The MG ECU 24 controls a controlled variable of the motor generator 10 by operating the main inverter 22.

An electrical control unit for the engine and the transmission (EG/TM ECU) 26 controls a controlled variable of the engine 20 and changes a transmission gear ratio of the transmission 12.

A hybrid electrical control unit (HV ECU) 34 is upstream of the MG ECU 24 and the EG/TM ECU 26. In other words, only the HV ECU 34 receives a request from a user via a user interface. The HV ECU 34 calculates a controlled variable of the motor generator 10 and a controlled variable of the engine 20, for example, on the basis of a detection value of actuation of a brake pedal 40, a detection value of actuation of an accelerator pedal 42, charging and discharging currents of the high-voltage battery 28 detected by a current sensor 36, and a temperature of the high-voltage battery 28 detected by a temperature sensor 38. In addition, the HV ECU 34 transmits a controlled-variable command value (a power requirement or the like) for the motor generator 10 to the MG ECU 24 and a controlled-variable command value (a power requirement) for the engine 20 to the EG/TM ECU 26.

The high-voltage battery 28 is connected to an electrical motor that drives a compressor of an air conditioner (A/C) 32 via the auxiliary inverter 30. For illustrative purpose, a controlling entity that controls the auxiliary inverter 30 is not shown in FIG. 1.

The HV ECU 34 is adapted to determine whether the drive wheel 16 is driven by the motor generator 10 only or by the engine 20. When the engine 20 is used to drive the drive wheel 16, the motor generator 10 may be used to charge the high-voltage battery 28 under a prescribed condition.

Figure 2:
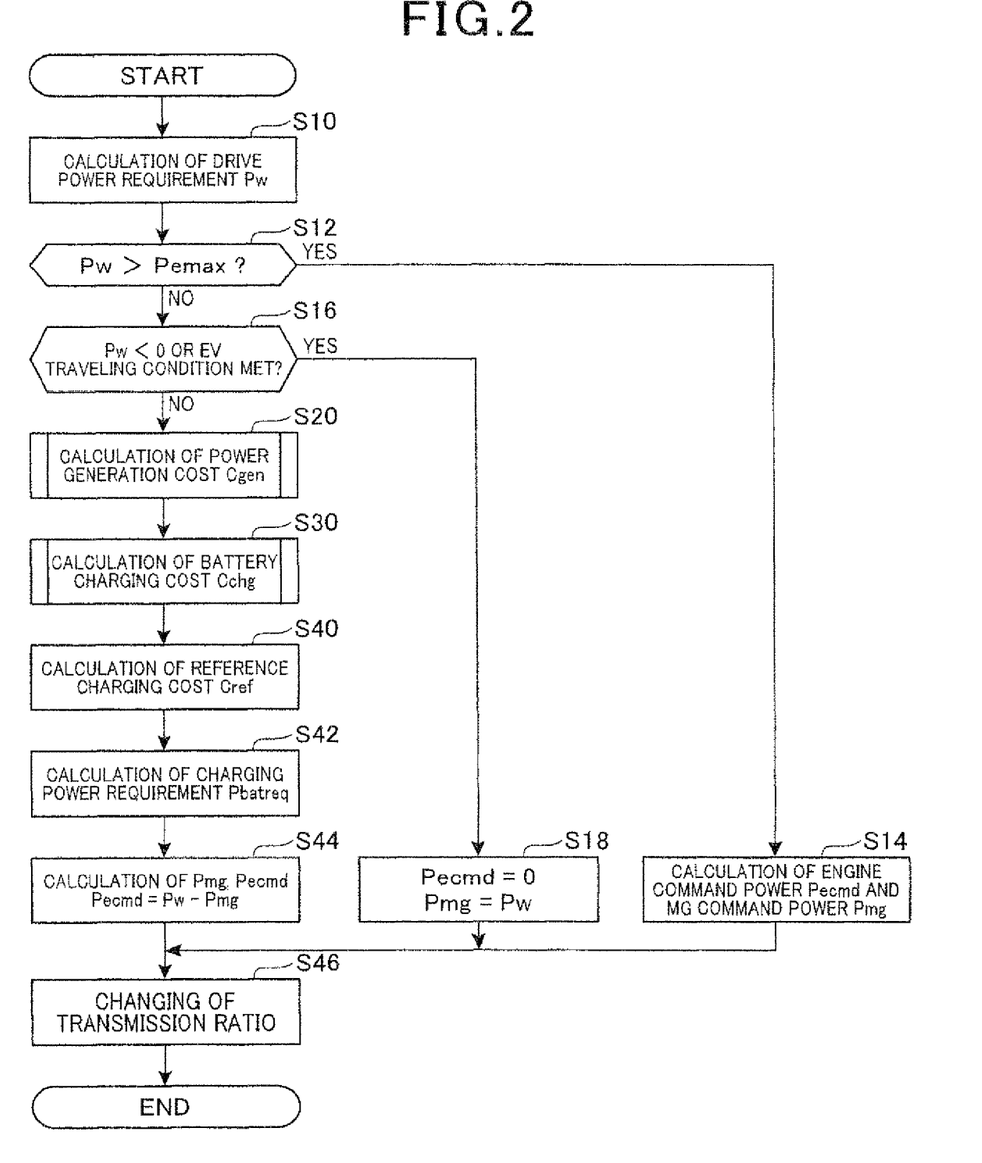
FIG. 2 schematically shows a flowchart of a battery charge controlling process.

FIG. 2 shows a flowchart of a battery charge controlling process to be performed by the HV ECU 34 in accordance with the present embodiment. This process is performed repeatedly at a predetermined time interval.

First, in step S10, a drive power requirement $P_w$, which is a traveling power of the vehicle, is calculated on the basis of an amount of actuation of the brake pedal 40 and an amount of actuation of the accelerator pedal 42. The drive power requirement $P_w$ is positive when the drive wheel 16 is supplied with positive drive power. Subsequently, in step S12, it is determined whether or not the drive power requirement $P_w$ is larger than a maximum power $P_{emax}$ of the engine 20, thereby determining whether or not the vehicle has to be inevitably supplied with a travelling power from the motor generator 10.

If it is determined in step S12 that the drive power requirement Pw is larger than a maximum power $P_{emax}$ of the engine 20, a command power $P_{ecmd}$ for the engine 10 and a command power $P_{mg}$ for the motor generator 10 are calculated in step S14, where the command power $P_{mg}$ may be set to $P_w-P_{emax}$ and the command power $P_{ecmd}$ may be set to the maximum power $P_{emax}$. The command power $P_{ecmd}$ is outputted to the EG/TM ECU 26, which in turn controls the engine 20 on the basis of the command power $P_{ecmd}$. The command power $P_{mg}$ is outputted to the MG ECU 24, which in turn operates the main inverter 22 to control the controlled variable of the motor generator 10 on the basis of the command power $P_{mg}$.

On the other hand, if it is determined in step S12 that the drive power requirement $P_w$ is equal to or smaller than a maximum power $P_{emax}$ of the engine 20, it is determined in step S16 whether or not the drive power requirement $P_w$ is negative or an EV traveling condition is met. Basically, the EV traveling condition is met within a small region of drive torque requirement of the drive wheel 16 as sown in FIG. 3A.

Figure 3A:
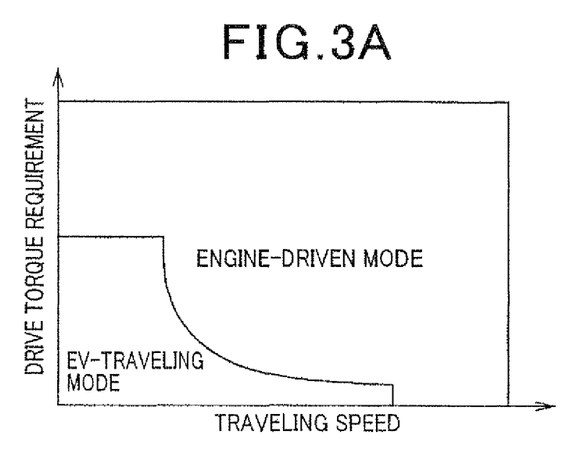
FIG. 3A schematically shows an EV-traveling region where an EV-traveling condition is met.

In the EV traveling mode (or motor-driven mode), a larger traveling speed of the vehicle is allowable for a smaller drive torque requirement.

If it is determined in step S16 that the drive power requirement $P_w$ is negative or the EV traveling condition is met, the command power $P_{ecmd}$ for the engine 20 is set to zero and the command power $P_{mg}$ for the motor generator 10 is set to the drive power requirement $P_w$ in step S18.

If it is determined in step S16 that the drive power requirement $P_w$ is not negative and the EV traveling condition is not met, a power generation cost $C_{gen}$ is calculated in step S20. The power generation cost $C_{gen}$ is a cost for generating a unit electric power by the motor generator 10 converting the power of engine 20 into electrical energy. More specifically, the power generation cost $C_{gen}$ (g/kwh) is an increment in fuel consumption of the engine 20 required to generate the unit electric power through the motor generator 10.

Figure 4:
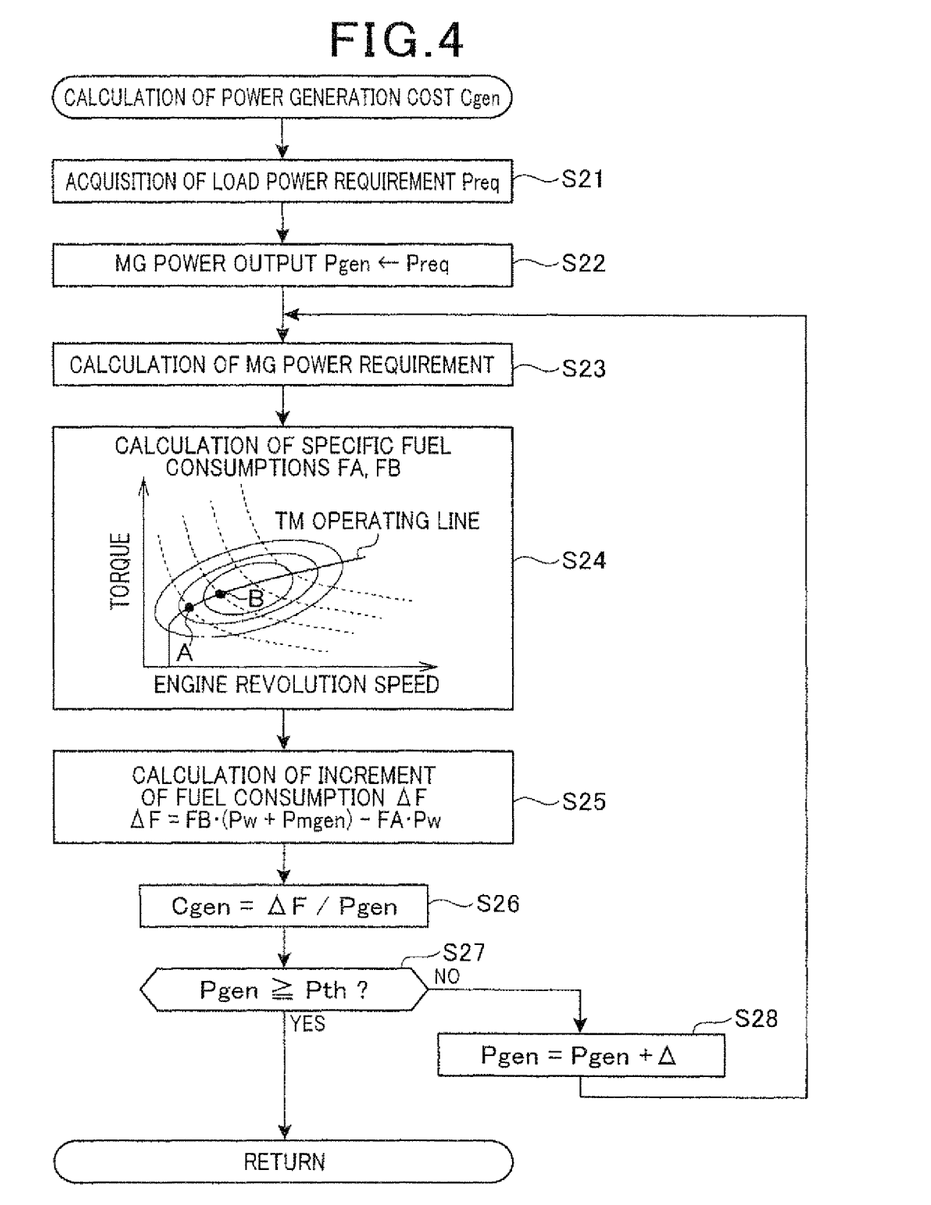
FIG. 4 schematically shows a flowchart of a calculation process of a power generation cost $C_{gen}$ to be performed in the battery charge controlling process.

FIG. 4 shows a calculation process of the power generation cost $C_{gen}$.

In the calculation process of $C_{gen}$, first, a load power requirement $P_{req}$ is acquired in step S21. Basically, the load power requirement $P_{req}$ is a power requirement of a load (auxiliary inverter 30 or the like) directly supplied with electrical power from the high-voltage battery 28. Such a load is not limited to the auxiliary inverter 30, and may be a DC/DC (DC-to-DC) converter that steps down a voltage of the high-voltage battery 28 and outputs it to a low-voltage battery (not shown).

Subsequently, in step S22, a MG power output $P_{gen}$ is tentatively set to the load power requirement $P_{req}$. In next step S23, a MG power requirement $P_{mgen}$, which is a power requirement for the motor generator 10 to generate the MG power output $P_{gen}$, is obtained by dividing the MG power output $P_{gen}$ by a power generation efficiency.

In step S24, there are calculated a specific fuel consumption FA when the power of the engine 20 is the drive power requirement $P_w$ and a specific fuel consumption FB when the power of the engine 20 is the drive power requirement $P_w$ plus the MG power requirement $P_{mgen}$. As shown in FIG. 4, the specific fuel consumptions may be calculated by using a map defining a correspondence relation between operating points and efficiency information (on specific fuel consumptions) where the operating points are each determined by a torque and a revolution speed of the engine. In FIG. 4, solid lines represent curves of operating points where on each curve the specific fuel consumption is constant, and dashed lines represent curves of operating points where on each curve the power of the engine is constant.

More specifically, in the present embodiment, each of the specific fuel consumptions FA, FB is calculated as a specific fuel consumption on a TM operating line. The TM operating line is defined by minimizing the specific fuel consumption over various revolution speeds of the engine 20 obtained by actuating the transmission 12 while the revolution speed of the drive wheel 16 is being fixed. The specific fuel consumption FA is a specific fuel consumption at an operating point on the TM operating line where the power of the engine 20 coincides with the drive power requirement $P_w$. The specific fuel consumption FB is a specific fuel consumption at an operating point on the TM operating line where the power of the engine 20 coincides with the drive power requirement Pw plus the MG power requirement $P_{mgen}$.

Subsequently, in step S25, an increment of fuel consumption of the engine $\Delta F$ during transition from the operating point A to the operating point B can be calculated by the following equation.

$$\Delta F = FB \cdot (P_w + P_{mgen}) - FA \cdot P_w \tag{c1}$$

In next step S26, the power generation cost $C_{gen}$ when the MG power output $P_{gen}$ is tentatively set to the load power requirement $P_{req}$ is calculated by $\Delta F/P_{gen}$.

In step S27, it is determined whether or not the tentatively-set MG power output $P_{gen}$ is larger than a threshold power Pth which is assumed to be an upper limit of generable electrical power of the motor generator 10, that is, a smaller one of a maximum MG power output of the motor generator 10 and a surplus of power of the engine 20 ($P_{emax} - P_w$). If it is determined in step S27 that the tentatively-set MG power output $P_{gen}$ is smaller than the threshold power Pth, then the MG power output $P_{gen}$ is incremented by a specified amount $\Delta$ in step S28, and the process then returns to step S23. If it is determined in step S27 that the tentatively-set MG power output $P_{gen}$ is equal to or larger than the threshold power Pth, then the process is ended, which is followed by step 30 as shown in FIG. 3.

Returning to FIG. 2, a battery charging cost $C_{chg}$ is calculated in step S30. The battery charging cost $C_{chg}$ is a cost for generating a unit charged power (or unit stored power) by the motor generator 10 converting the power of engine 20 into electrical energy to be charged in the high-voltage battery 28. More specifically, the battery charging cost $C_{chg}$ (g/kwh) is an increment in fuel consumption of the engine 20 required to generate the unit charged power through the motor generator 10.

Figure 5:
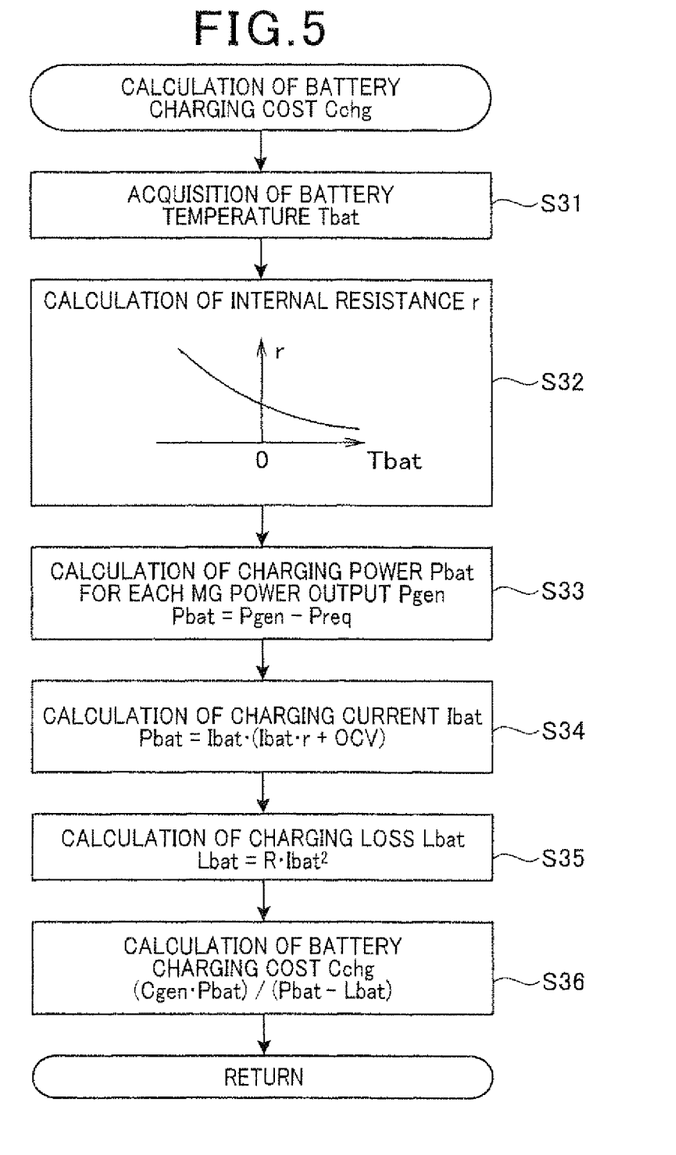
FIG. 5 schematically shows a flowchart of a calculation process of a battery charging cost $C_{chg}$ to be performed in the battery charge controlling process.

FIG. 5 shows a calculation process of the battery charging cost $C_{chg}$.

In step S31 of the $C_{chg}$ calculation process, a temperature $T_{bat}$ of the high-voltage battery 28 detected by the temperature sensor 38 is acquired first. Subsequently, in step S32, an internal resistance r of the high-voltage battery 28 is calculated on the basis of the temperature $T_{bat}$. In the present embodiment, the internal resistance r is calculated by using a map defining a correspondence relation between the temperature $T_{bat}$ and the internal resistance r previously determined by experiment. In the map, a larger internal resistance r corresponds to a lower temperature $T_{bat}$.

In next step S33, a battery charging power $P_{bat}$ is calculated for each MG power output $P_{gen}$ tentatively set in the calculation process of the power generation cost $C_{gen}$ as shown in FIG. 4. The charging power $P_{bat}$ is given by subtracting the load power requirement $P_{req}$ from the MG power output $P_{gen}$. In step S34, there is calculated a battery charging current $I_{bat}$ when the high-voltage battery 28 is charged with the charging power $P_{bat}$. The charging current $I_{bat}$ is a positive solution to the following quadratic equation.

$$P_{bat} = I_{bat} \cdot (I_{bat} \cdot r + OCV) \tag{c2}$$

In the above equation (c2), an open circuit voltage (OCV) of the high-voltage battery 28 is used, which can be calculated by using a map on the basis of a state of charge (SOC) of the high-voltage battery 28.

Subsequently, in step S35, a battery charging loss $L_{bat}$ is calculated. The charging loss $L_{bat}$ is given by the internal resistance r multiplied by a square of the charging current $I_{bat}$. In next step S36, the battery charging cost $C_{chg}$ is calculated for each MG power output $P_{gen}$ tentatively set in the $C_{gen}$ calculation process. The battery charging cost $C_{chg}$ is given by $(C_{gen} \cdot P_{bat})/(P_{bat} - L_{bat})$, where $C_{gen}$ is the power generation cost for the tentatively set MG power output $P_{gen}$, $P_{bat}$ is the battery charging power to the tentatively set MG power output $P_{gen}$, and $L_{bat}$ is the charging loss.

Figure 3B:
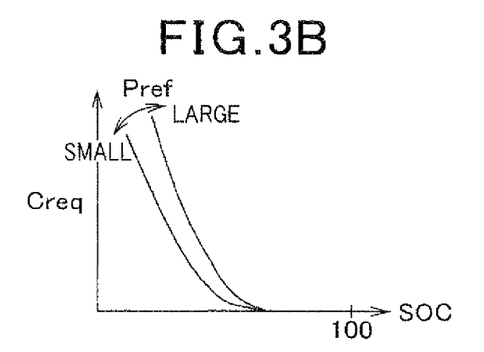
FIG. 3B schematically shows a change in reference charging cost $C_{ref}$ associated with a change in SOC of a high-voltage battery.

Referring again to FIG. 2, step S30 in FIG. 2 is completed upon completion of step S36 in FIG. 5, which is flowed by step S40. In step S40, a reference charging cost $C_{ref}$ is calculated. The reference charging cost $C_{ref}$ is a parameter (or indicator) indicative of a degree of battery charging request of the high-voltage battery 28. As shown in FIG. 3B, the reference charging cost $C_{ref}$ is such that the reference charging cost $C_{ref}$ takes a larger value for a smaller SOC of the high-voltage battery 28. This means that a degree of battery charging request of the high-voltage battery 28 becomes larger for a smaller SOC of the high-voltage battery 28. In addition, the reference charging cost $C_{ref}$ is such that the reference charging cost $C_{ref}$ takes a larger value for a larger load power requirement $P_{req}$. This means that, since a larger amount of power is discharged from the high-voltage battery 28 for a larger load power requirement $P_{req}$, a degree of battery charging request becomes larger for a larger amount of power discharged from the high-voltage battery 28.

Figure 3C:
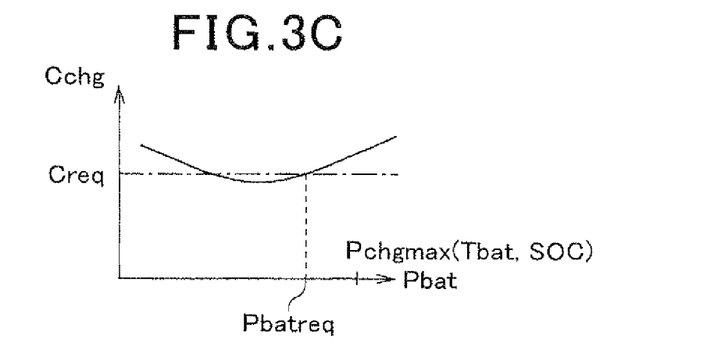
FIG. 3C schematically shows a calculation process of a charging power requirement $P_{batreq}$.

In step S42 in FIG. 2, a charging power requirement $P_{batreq}$ is calculated. As shown in FIG. 3C, the charging power requirement $P_{batreq}$ is defined by the largest one of the charging powers $P_{bat}$ that are equal to or smaller than an upper limit of charging power $P_{chgmax}$ for the high-voltage battery 28, whose corresponding battery charging costs $C_{chg}$ calculated on the basis of the respective MG power outputs $P_{gen}$ tentatively set in the $C_{gen}$ calculation process are equal to or smaller than the reference charging cost $C_{ref}$. FIG. 3C shows, as an example, that the charging power requirement $P_{batreq}$ is defined by the largest one of the two charging powers $P_{bat}$ corresponding to the respective intersection points between the reference charging cost $C_{ref}$ and a curve that connects the battery charging costs $C_{chg}$ calculated on the basis of the respective tentatively set MG power outputs $P_{gen}$. It should be noted that the upper limit $P_{chgmax}$ is a function of the temperature $T_{bat}$ and the SOC of the high-voltage battery 28.

In step S44 of FIG. 2, the command power $P_{mg}$ for the motor generator 10 and the command power $P_{ecmd}$ for the engine 20 are calculated, where the command power $P_{mg}$ is required to achieve the charging power requirement $P_{batreq}$. In the present embodiment, since the command power $P_{mg}$ is such that it takes a positive value on the power-running side, the command power $P_{mg}$ is given by $(-1)\cdot(P_{batreq}+P_{req})/$ (power generation efficiency), which leads to the command power $P_{ecmd}$ given by $P_w-P_{mg}$.

Subsequently to steps S44, S14, S18 in FIG. 2, a transmission gear ratio of the transmission 12 is changed in step S46. When the process proceeds from step S44 to step S46, the transmission gear ratio is set in step S46 such that the operating point corresponding to the MG power output $P_{gen}=P_{batreq}+P_{req}$ can be obtained. Meanwhile, when the process proceeds from step S14 or S18 to step S46, the transmission gear ratio is fixed at a predetermined value.

There will now be explained some advantages of the present embodiment with reference to FIG. 6.

Figure 6A:
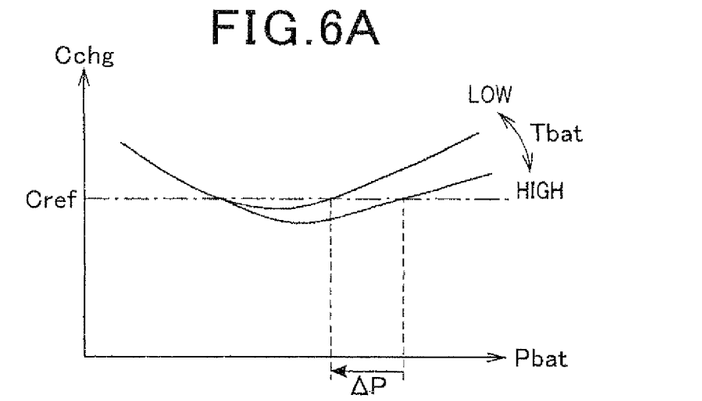
FIG. 6A schematically shows a change in charging power requirement $P_{batreq}$ associated with a change in battery temperature $T_{bat}$.

As shown in FIG. 6A, the charging power requirement P batreq decreases gradually as the temperature $T_{bat}$ of the high-voltage battery 28 decreases even with the reference charging cost $C_{ref}$ being unchanged. This is because the internal resistance r increases as the temperature $T_{bat}$ decreases. In other words, as the charging loss $L_{bat}$ increases, the battery charging cost $C_{chg}$, which is an increment of fuel consumption required for storing a unit electric power in the high-voltage battery 28, increases. Therefore, even if the reference charging cost $C_{ref}$ is kept at the same level, the charging power requirement $P_{batreq}$ decreases. The battery charging cost $C_{chg}$ can thus be considered to be a parameter (or indicator) indicative of a degree of battery charge limiting request. In addition, since the degree of battery charge limiting request is quantified as a continuous value (in practice, a discretized value due to digital processing), the degree of battery charge limiting request can be suitably expressed as a function of the temperature $T_{bat}$. Further, since the degree of battery charge limiting request may not be quantified simply as the upper limit of charging power, the charging power requirement $P_{batreq}$ can be calculated such that the degree of battery charging request and the degree of battery charge limiting request can be consistent with each other.

Figure 6B:
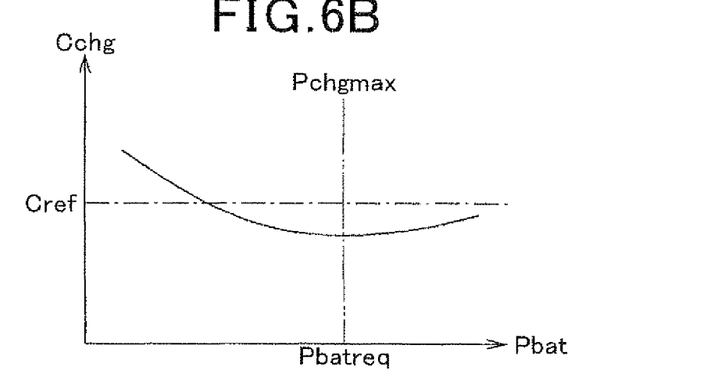
FIG. 6B schematically shows a first special case of setting of the charging power requirement $P_{batreq}$.

FIG. 6B shows that only the smallest one of the charging powers $P_{bat}$ whose corresponding battery charging costs $C_{chg}$ coincide with the reference charging cost $C_{ref}$ is smaller than the upper limit of charging power $P_{chgmax}$. In such a case, the charging power requirement $P_{batreq}$ is set to the upper limit $P_{chgmax}$.

Figure 6C:
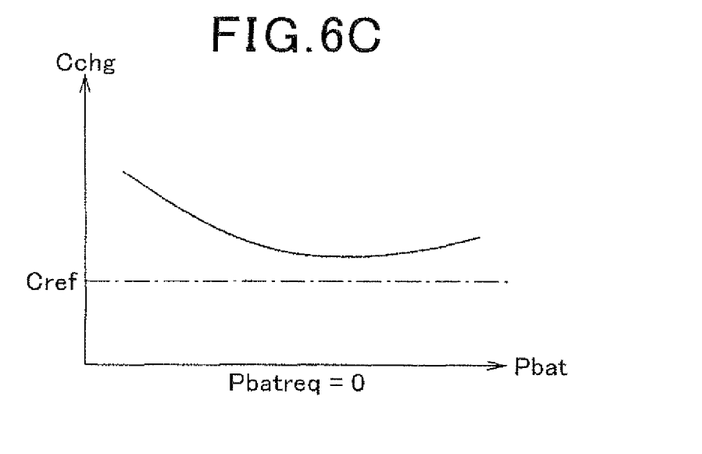
FIG. 6C schematically shows a second special case of setting of the charging power requirement $P_{batreq}$.

FIG. 6C shows that there is no battery charging cost $C_{chg}$ at or below the reference charging cost $C_{ref}$. In such a case, the charging power requirement $P_{batreq}$ is set to zero.

Summary of the Present Embodiment (1) In the present embodiment, the battery charging cost $C_{chg}$ is calculated taking into account the charging loss $L_{bat}$, and the charging power requirement $P_{batreq}$ of the high-voltage battery 28 is set such that the corresponding battery charging cost $C_{chg}$ is equal to or smaller than the reference charging cost $C_{ref}$, which leads to the battery charging power that can suitably suppress decrease in fuel utilization efficiency.

(2) In the present embodiment, the charging loss $L_{bat}$ is calculated on the basis of the temperature $T_{bat}$ of the high-voltage battery 28, which allows the charging power requirement $P_{batreq}$ to be calculated taking into account the fact that the charging loss $L_{bat}$ increases as the temperature $T_{bat}$ decreases.

(3) In the present embodiment, the charging loss $L_{bat}$ is calculated on the basis of the internal resistance r as a function of the temperature $T_{bat}$ of the high-voltage battery 28. This allows the high-voltage battery 28 to be modeled using an electrical circuit model, which facilitates calculation of the charging loss $L_{bat}$.

(4) In the present embodiment, a plurality of MG power outputs $P_{gen}$ of the motor generator 10 are tentatively set, and for each MG power output $P_{gen}$, the battery charging cost $C_{chg}$ corresponding thereto is calculated. This allows the charging power requirement $P_{batreq}$ to be set to more suitably reflect the charging loss associated with battery charge.

(5) In the present embodiment, the operating point of the engine 20 for each tentatively set MG power output $P_{gen}$ is limited onto the TM operating line. This allows the battery charging cost $C_{chg}$ to be calculated such that the fuel utilization efficiency is maximized by changing the revolution speed of the engine.

(6) In the present embodiment, the engine 20 is adapted to be mechanically-connected to the drive wheel 16. With this configuration, the revolution speed the engine 20 is liable to be limited by the revolution speed drive wheel 16, which leads to the limited fuel usage efficiency of the engine 20. Therefore, limiting of the operating points onto the TM operating line by using the transmission 12 is of great utility value.

Other Embodiments

There will now be explained other embodiments of the present invention.

Regarding the Indicator for the Degree of Battery Charge Limiting Request

In the above embodiment described in detail, a plurality of charging powers $P_{bat}$ are tentatively set in the $C_{chg}$ calculation process (see S20, S30 in FIG. 2).

In some alternative embodiments, for example, a charging power apart from the current charging power by a predetermined amount of power may be tentatively set. If the battery charging cost $C_{chg}$ calculated on the basis of the tentatively set charging power is equal to or smaller than the reference charging cost $C_{ref}$, then the current charging power is allowed to change to the tentatively set charging power. On the other hand, if the battery charging cost $C_{chg}$ calculated on the basis of the tentatively set charging power is larger than the reference charging cost $C_{ref}$, then the current charging power is kept unchanged and the charging power to be tentatively set next time is set smaller than the current charging power.

In the above embodiment described in detail, the battery charging cost $C_{chg}$ is calculated as an indicator indicative of the degree of battery charge limiting request.

In some alternative embodiments, for example, an indicator indicative of the degree of battery charge limiting request may be calculated by $(r_{max}-r)/(r_{max}-r_{min})$ (=Ind1), where $r_{max}$ is a maximum value of the internal resistance, $r_{min}$ is a minimum value of the internal resistance, and r is the current internal resistance. When the charging power requirement is calculated as an indicator indicative of the degree of battery charging request, the actual charging power may be set to the charging power requirement multiplied by the indicator Ind1. Further in consideration of the fact that the battery charging loss associated with battery charge is proportional to a square of the charging current, it is desirable to take into account the charging current. For example, the indicator indicative of the degree of battery charge limiting request that takes into account the charging current may be given by $((P_{MAX}-Pr)/P_{MAX})^2 \cdot ((r_{max}-r)/(r_{max}-r_{min}))$ (=Ind2), where $P_{MAX}$ is a maximum charging power, Pr is the charging power requirement. In addition, when the fuel utilization efficiency significantly varies with different operating points as in the case of engine, it is more desirable to take into account the fuel utilization efficiency so that the degree of battery charge limiting request becomes larger as the utilization efficiency decreases. For example, the indicator indicative of the degree of battery charge limiting request that takes into account the fuel utilization efficiency may be given by $(E-E_{min})/(E_{max}-E_{min}) \cdot ((P_{MAX}-P_r)/P_{MAX})^2 \cdot ((r_{max}-r)/(r_{max}-r_{min}))$ (=Ind3) where $E_{max}$ is a maximum value of the fuel utilization efficiency (an inverse of the specific fuel consumption or the like), $E_{min}$ is a minimum value of the fuel utilization efficiency, and E is a utilization efficiency of the operating point during charging of the battery. In determining the operating points during charging of the battery, a plurality of charging powers are tentatively set such that the charging powers are smaller than the charging power requirement $P_r$, and for each charging power the corresponding operating point is set in a similar manner as described above regarding the above embodiment. The actual charging power may be given by a maximum power of the charging powers each multiplied by the corresponding indicator of the degree of battery charge limiting request (Ind1, Ind2, or Ind3), In the above embodiment described in detail, the indicator indicative of the degree of battery charge limiting request is assumed to take a continuous value. In some alternative embodiments, the indicator may take three or more discrete values.

Regarding the Indicator for the Degree of Battery Charge Request

In the above embodiment described in detail, the reference charging cost $C_{ref}$ is calculated on the basis of both the load power requirement $P_{req}$ and the SOC of the battery.

In some alternative embodiments, the reference charging cost $C_{ref}$ may be calculated on the basis of either one of the load power requirement $P_{req}$ and the SOC. The SOC may be replaced with an amount of charge. In further alternative embodiments, an additional input parameter for calculation of the reference charging cost $C_{ref}$ may be included, such as information from a navigation system. When the vehicle is approaching a downhill slope near the present location, a degree of request for power generation accompanied by fuel consumption may be decreased by decreasing the reference charging cost $C_{ref}$.

In further alternative embodiments, instead of calculating the upper limit of cost (reference charging cost $C_{ref}$) as described in the above paragraph "Regarding the indicator for the degree of battery charge limiting request", for example, the charging power requirement may be calculated so as to increase with an increasing difference between the current SOC and the SOC when fully charged.

In the above embodiment described in detail, the indicator (or parameter) indicative of the degree of battery charge request is assumed to take a continuous value. In some alternative embodiments, the indicator may take three or more discrete values.

Regarding the Limitation of the Charging Power

In the above embodiment described in detail, the charging power is calculated on the basis of the indicator indicative of the degree of battery charging request and the indicator indicative the degree of battery charge limiting request.

In some alternative embodiments, the upper limit of the charging power may be variably set according to whether or not the temperature of the secondary battery is equal to or lower than a specified temperature.

In the above embodiment described in detail where the charging power is calculated on the basis of the indicator indicative of the degree of battery charging request and the indicator indicative the degree of battery charge limiting request (see FIG. 2), it can be found that there exists a one-to-one correspondence between a set of input parameters (the temperature $T_{bat}$, the SOC, the load power requirement $P_{req}$, the drive power requirement $P_w$, the revolution speed of the drive wheel 16) and the charging power requirement $P_{batreq}$.

In consideration of the finding, in further alternative embodiments, for example, there may be prepared a map defining a correspondence relation between the input parameter set and the charging power requirement $P_{batreq}$, which can create the same effect as in the above embodiment without performing the calculation of the charging power requirement $P_{batreq}$ on the basis of the indicator indicative of the degree of battery charging request and the indicator indicative of the degree of battery charge limiting request on the HV ECU control unit.

Regarding Calculation of the Charging Loss

In the above embodiment described in detail, the charging loss is calculated on the basis of the internal resistance as a function of the temperature of the secondary battery (high-voltage battery 28) where it is assumed that the battery can be modeled in an electrical circuit model.

In some alternative embodiments, for example, a chemical reaction model may be used as a model of the secondary battery instead of the electrical circuit model as used in the above embodiment, where it is likely that the internal resistance is not used as a linear element. Also in such an embodiment, when a degree of increase in charging loss of the battery associated with decrease in battery temperature can be quantified, it will be possible to calculate the charging loss on the basis of such a chemical reaction model of the battery.

Regarding Setting of the Operating Points

In the present embodiment, a set of operating points each specified by a pair of revolution speed and torque of the engine are set such that the specific fuel consumption is minimized at each operating point and the operating points reside over the revolution speed region of the engine 20 feasible through gear-shifting of the transmission 12, In some alternative embodiments, for example, a set of operating points each specified by a pair of revolution speed and torque of the engine are set such that the specific fuel consumption is minimized at each operating point and the set of operating points reside over a sub-region within the revolution speed region of the engine 20 feasible through gear-shifting of the transmission 12 where the sub-region consists of the revolution speeds each apart from the current revolution speed by a predetermined amount of revolution speed. Or, only the torque may be increased with the revolution speed being fixed so that the operating point specified by a pair of revolution speed and torque can generate the desired charging power.

Regarding the Transmission

In the present embodiment, the transmission is the CVT In some alternative embodiments, the transmission may be replaced with a stepped variable transmission. In further alternative embodiments, the transmission may be replaced with a planetary gear train that includes a sun gear mechanically connected to a motor generator, a carrier mechanically connected to the engine, and a ring gear mechanically connected to the motor generator and the drive wheel. Also in such an embodiment, the gear ratio may be variably set between the engine and the drive wheel.

In some alternative embodiments, the vehicle may be provided with no transmission (gear-shifting mechanism).

Regarding the Secondary Battery

In the above embodiment described in detail, the secondary battery is a lithium-ion secondary battery (high-voltage battery 28). In some alternative embodiments, the secondary battery may be a nickel-metal-hydride secondary battery or a lead secondary battery.

In the above embodiment described in detail, there is used as a secondary battery the high-voltage battery 28 that is electrically connected to the power converter circuit (main inverter 22) for supplying electrical power to the vehicle-mounted main component. In some alternative embodiments, only the internal-combustion engine may be a main component, and the secondary battery may be directed to accessories only.

Regarding the Fuel

In the above embodiment described in detail, the fuel is fuel that is converted into combustion energy by the internal-combustion engine. In some alternative embodiments, for example, the fuel may be fuel for a fuel cell that supplies electrical power to a vehicle-mounted electrical motor. Advantageously, when the secondary battery needs to be charged by the fuel cell, the battery charging power may be set taking into account a charging loss during charging of the battery as a function of the temperature of the secondary battery.

Regarding the Prime Mover

In the present embodiment, the prime mover is a vehicle-mounted main component. In some alternative embodiments, for example, the prime mover may be an internal-combustion engine for a series hybrid car. Also in such an embodiment, when the temperature of the secondary battery is low, the battery charging power is increased, which leads to a larger charging loss and thus to a reduced fuel utilization efficiency. The invention can suppress the decrease in fuel utilization efficiency.

In the above embodiment described in detail, the prime mover is the internal-combustion engine that consumes a fuel. In some alternative embodiments, the prime mover may be a fuel cell as described in the above paragraph "Regarding the fuel".

Regarding the Power Generation

In the above embodiment described in detail, rotation energy of the internal-combustion engine (engine 20) is converted into electrical energy. In some alternative embodiments, for example, waste heat of the internal-combustion engine may be converted into electrical energy.

Others

In the above embodiment described in detail, the internal resistance varies with the temperature of the secondary battery (high-voltage battery 28). Even when the internal resistance is kept constant with the varying temperature of the battery, the battery charging power may be set so as to suppress increase or decrease in charging loss as a function of an amount of charging current.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A battery charge control apparatus for a vehicle, the vehicle being provided with a prime mover driven by using fuel stored in the vehicle, power generation means for converting energy generated by the prime mover using the fuel into electrical energy, and a secondary battery that stores the electrical energy generated by the power generation means, the apparatus comprising:
    cost calculation means for calculating a cost that is an amount of fuel consumed by the prime mover to generate the battery charging power used to actually store unit electric power in the battery;
    upper-limit setting means for setting an upper limit of the cost on the basis of at least one of a state of charge (SOC) of the battery and a power requirement of a load that is supplied with the electrical power from the battery;
    battery-charge limiting means for setting the battery charging power such that the cost calculated by the cost calculation means becomes equal to or smaller than the upper limit set by the upper-limit setting means; and
temperature detection means for detecting a temperature of the battery,
wherein the cost calculation leans includes charging loss calculation means for calculating a charging loss that is waste thermal energy to be generated during storing of the electrical energy in the battery on the basis of an internal resistance of the battery as a function of the temperature of the battery detected by the temperature detection means, and
the cost calculation means further includes actually-stored power calculation means for calculating electrical power actually stored in the battery by subtracting the charging loss calculated by the charging loss calculation means from the battery charging power set by the battery-charge limiting means.

2. The apparatus of claim 1, wherein the cost calculation means includes charging power setting means for tentatively setting a plurality of charging powers for storing the electrical energy in the battery, and the cost calculation means calculates the cost for each of the plurality of charging powers.

3. The apparatus of claim 2, wherein
the prime mover is mechanically-connected to the drive wheel, and the vehicle is provided with transmission means for variably setting a ratio between a revolution speed of the drive wheel and a revolution speed of the prime mover,
the charging power setting means includes operating point setting means for setting, for each of the tentatively set charging powers, an operating point specified by a revolution speed of the prime mover within a revolution speed region of the prime mover feasible through the transmission means with the revolution speed of the drive wheel being fixed.

4. The apparatus of claim 3, wherein the operating point setting means sets, for each of the tentatively set charging powers, an operating point specified by a pair of revolution speed and torque of the prime mover where the specific fuel consumption is minimized.

5. The apparatus of claim 1, wherein the prime mover is mechanically-connected to the drive wheel.

6. The apparatus of claim 1, wherein the prime mover is an internal-combustion engine.

7. A battery charge control apparatus for a vehicle, the vehicle being provided with a vehicle-mounted component driven by using fuel stored in the vehicle, a power generator for converting energy generated by the vehicle-mounted component using the fuel into electrical energy, and a secondary battery that stores the electrical energy generated by the power generator, the apparatus comprising:
a temperature sensor configured to detect a temperature of the battery; and
a control system at least configured to perform:
a cost calculation for calculating a cost that is an amount of fuel consumed by the vehicle-mounted component to generate the battery charging power used to actually store unit electric power in the battery;
an upper-limit setting in which an upper limit of the cost is set on the basis of at least one of a state of charge (SOC) of the battery and a power requirement of a load that is supplied with the electrical power from the battery; and
a battery-charge limiting in which the battery charging power is set such that the cost calculated by the cost calculation becomes equal to or smaller than the upper limit set by the upper-limit setting; wherein:
the cost calculation includes a charging loss calculation for calculating a charging loss that is waste thermal energy to be generated during storing of the electrical energy in the battery on the basis of an internal resistance of the battery as a function of the temperature of the battery detected by temperature sensor; and
the cost calculation further includes an actually-stored power calculation for calculating electrical power actually stored in the battery by subtracting the charging loss calculated by the charging loss calculation from the battery charging power set by the battery-charge limiting.

8. The apparatus of claim 7, wherein the cost calculation includes charging power setting for tentatively setting a plurality of charging powers for storing the electrical energy in the battery, and the cost calculation calculates the cost for each of the plurality of charging powers.

9. The apparatus of claim 8, wherein:
the vehicle-mounted component is mechanically-connected to the drive wheel, and the vehicle is provided with transmission part for variably setting a ratio between a revolution speed of the drive wheel and a revolution speed of the vehicle-mounted component,
the charging power setting includes operating point setting for setting, for each of the tentatively set charging powers, an operating point specified by a revolution speed of the vehicle-mounted component within a revolution speed region of the vehicle-mounted component feasible through the transmission part with the revolution speed of the drive wheel being fixed.

10. The apparatus of claim 9, wherein the operating point setting sets, for each of the tentatively set charging powers, an operating point specified by a pair of revolution speed and torque of the vehicle-mounted component where the specific fuel consumption is minimized.

11. The apparatus of claim 7, wherein the vehicle-mounted component is mechanically-connected to the drive wheel.

12. The apparatus of claim 7, wherein the vehicle-mounted component is an internal-combustion engine.

* * * * *